Patented Aug. 7, 1945

2,381,794

UNITED STATES PATENT OFFICE 2,381,794

PROCESS OF PREPARING PYRIDINE CARBOXYLIC ACIDS

John Weijlard, Westfield, John P. Messerly, Clark Township, Union County, and Max Tishler, Rahway, N. J., assignors to Merck & Co., Inc., Rahway, N. J., a corporation of New Jersey No Drawing. Application May 11, 1943, Serial No. 486,540

20 Claims. (Cl. 260—295.5)

This invention relates generally to processes for preparing organic chemical compounds and in a more particular sense is concerned with a process applicable to the preparation of pyridine carboxylic acids.

Trigonelline, the betaine of N-methyl nicotinic acid, has been converted to nicotinic acid by treatment with hydrochloric acid at elevated temperatures and very high pressures.

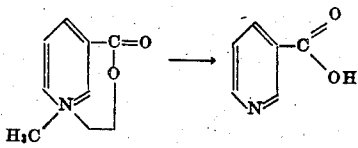

The conditions under which this reaction occurs are extreme: heating in a high pressure bomb to a temperature of the order of 250° C. for thirty hours or thereabouts. This process is unsatisfactory due to the hazards incidental to use of a high pressure bomb.

According to the process forming the subject matter of the present invention, it is possible under ordinary operating conditions to convert betaines of N-alkyl-, N-aryl-, or N-aralkyl-pyridine carboxylic acids into the corresponding pyridine carboxylic acids.

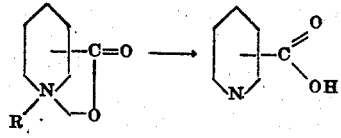

This is accomplished by use of a novel reagent in lieu of the hydrochloric acid to cleave the betaine heterocycle, and which functions quickly at moderate temperatures and under ordinary atmospheric pressures. In particular, trigonelline, when treated according to this invention, can be converted into nicotinic acid in commercially attractive yields without operating under the extraordinary conditions of pressure and time above mentioned. In like manner homarin yields picolinic acid and N-methyl-isonicotinic acid betaine yields isonicotinic acid.

The reagent used in the process according to this invention is a pyridine hydrohalide. It is somewhat remarkable, in view of the excellent yields obtained with this reagent, that other quaternary nitrogen compounds such as aniline hydrochloride, quinoline hydrochloride, and ammonium chloride, when substituted for the pyridine hydrohalide, give no detectable yields of the desired product and even more remarkable is the fact that pyridine sulfate fails to give the pyridine carboxylic acid. Although pyridine hydrochloride is the preferred reagent, other pyridine hydrohalides, for instance pyridine hydrobromide, can be used but the yields of desired product obtained are less satisfactory than with use of the hydrochloride.

Regarded in certain of its broader aspects, the novel process according to this invention comprises heating, at a temperature within the range 150° C. to 250° C., a mixture of a betaine of a N-alkyl-, N-aryl-, or N-aralkyl-pyridine carboxylic acid and a pyridine hydrohalide although the optimum period for heating the reactants is about two hours, reasonably satisfactory yields of the desired product are obtained over the range of one to three hours; longer or shorter periods of heating result in low yields. When the reactants are heated at a temperature within the range 150° C. to 250° C. for about two hours, the pyridine carboxylic acid is obtained in satisfactory yields, with optimum yields at temperatures of the order of 200° C.

The following examples illustrate methods of carrying out the present invention, but it is to be understood that these examples are given by way of illustration and not of limitation.

Example 1

About two parts by weight of trigonelline are mixed with approximately six parts by weight of pyridine hydrochloride and heated in an open vessel at about 200° C. for nearly 3 hours. The nicotinic acid obtained can be separated from the other components of the reaction mixture by dissolving the mixture in about 100 parts by weight of water, neutralizing and adding a soluble copper salt such as cupric sulfate, which causes precipitation of copper nicotinate. The copper salt can be decomposed by treatment with hydrogen sulfide in aqueous suspension in the presence of formic acid. The product, impure pyridine-3-carboxylic acid, melts at about 230° C. and can be purified by crystallizing from hot water.

Example 2

About 5 parts by weight of trigonelline (88% pure) and approximately 15 parts by weight of pyridine hydrochloride are heated about 1 hour at a temperature of approximately 200° C. Subsequent treatment follows that described in Example 1 yielding substantially pure nicotinic acid, melting at about 235–237° C.

Example 3

About 5 parts by weight of trigonelline (88% pure) and approximately 15 parts by weight of pyridine hydrochloride are heated about 2 hours at a temperature of approximately 200° C. Subsequent treatment follows that described in Example 1 yielding substantially pure nicotinic acid melting at about 235–237° C.

Example 4

About two parts by weight of trigonelline (89% purity) and six parts by weight of pyridine hydrobromide are mixed and heated about two hours at approximately 200° C., after which further processing follows the description set forth in the preceding examples.

Modifications may be made in carrying out the present invention without departing from the spirit and scope thereof and the invention is to be limited only by the appended claims.

What is claimed is:

1. The process that comprises heating a mixture of a pyridine hydrohalide and a substance represented by the formula:

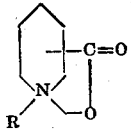

wherein R is a substituent selected from the class consisting of alkyl, aralkyl, and aryl groups to produce a pyridine carboxylic acid, and separating the pyridine carboxylic acid.

2. The process that comprises heating a mixture of a pyridine hydrohalide and a substance represented by the formula:

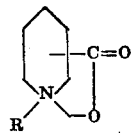

wherein R is an alkyl group to produce a pyridine carboxylic acid, and separating the pyridine carboxylic acid.

3. The process that comprises heating a mixture of a pyridine hydrohalide and a substance represented by the formula:

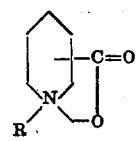

wherein R is an aralkyl group to produce a pyridine carboxylic acid, and separating the pyridine carboxylic acid.

4. The process that comprises heating a mixture of a pyridine hydrohalide and a substance represented by the formula:

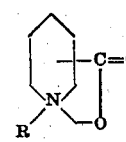

wherein R is an aryl group to produce a pyridine carboxylic acid, and separating the pyridine carboxylic acid.

5. The process that comprises heating at a temperature within the range 150° to 250° C. a mixture of a pyridine hydrohalide and a substance represented by the formula:

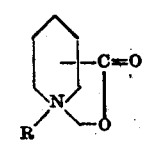

wherein R is a substituent selected from the class consisting of alkyl, aralkyl, and aryl groups to produce a pyridine carboxylic acid, and separating the pyridine carboxylic acid.

6. The process that comprises heating at a temperature within the range 150° to 250° C. a mixture of a pyridine hydrohalide and a substance represented by the formula:

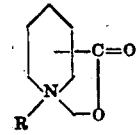

wherein R is an alkyl group to produce a pyridine carboxylic acid, and separating the pyridine carboxylic acid.

7. The process that comprises heating at a temperature within the range 150° to 250° C. a mixture of a pyridine hydrohalide and a substance represented by the formula:

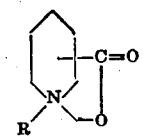

wherein R is an aralkyl group to produce a pyridine carboxylic acid, and separating the pyridine carboxylic acid.

8. The process that comprises heating at a temperature within the range 150° to 250° C. a mixture of a pyridine hydrohalide and a substance presented by the formula:

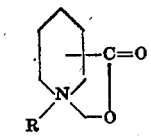

wherein R is an aryl group to produce a pyridine carboxylic acid, and separating the pyridine carboxylic acid.

9. The process that comprises heating at a temperature of the order of 200° C. a mixture of a pyridine hydrohalide and a substance represented by the formula:

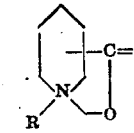

wherein R is a substituent selected from the class consisting of alkyl, aralkyl, and aryl groups to produce a pyridine carboxylic acid, and separating the pyridine carboxylic acid.

10. The process that comprises heating at a temperature of the order of 200° C. a mixture of a pyridine hydrohalide and a substance represented by the formula:

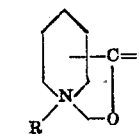

wherein R is an alkyl group to produce a pyridine carboxylic acid, and separating the pyridine carboxylic acid.

11. The process that comprises heating at a temperature of the order of 200° C. a mixture of a pyridine hydrohalide and a substance represented by the formula:

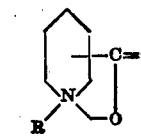

wherein R is an aralkyl group to produce a pyridine carboxylic acid, and separating the pyridine carboxylic acid.

12. The process that comprises heating at a temperature of the order of 200° C. a mixture of a pyridine hydrohalide and a substance represented by the formula:

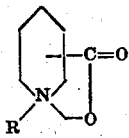

wherein R is an aryl group to produce a pyridine carboxylic acid, and separating the pyridine carboxylic acid.

13. The process that comprises heating a mixture of trigonelline and a pyridine hydrohalide at a temperature within the range 150° to 250° C. to produce nicotinic acid, and separating the nicotinic acid.

14. The process that comprises heating a mixture of trigonelline and a pyridine hydrohalide at a temperature of the order of 200° C to produce nicotinic acid, and separating the nicotinic acid.

15. The process that comprises heating a mixture of trigonelline and pyridine hydrochloride at a temperature within the range 150° to 250° C. to produce nicotinic acid, and separating the nicotinic acid.

16. The process that comprises heating a mixture of trigonelline and pyridine hydrochloride at a temperature of the order of 200° C. to produce nicotinic acid, and separating the nicotinic acid.

17. The process that comprises heating a mixture of trigonelline and a pyridine hydrohalide at a temperature within the range 150° to 250° C. for a period of one to three hours to produce nicotinic acid, and separating the nicotinic acid.

18. The process that comprises heating a mixture of trigonelline and a pyridine hydrohalide at a temperature of the order of 200° C. for a period of one to three hours to produce nicotinic acid, and separating the nicotinic acid.

19. The process that comprises heating a mixture of trigonelline and a pyridine hydrohalide at a temperature of 150° to 250° C. for about two hours to produce nicotinic acid, and separating the nicotinic acid.

20. The process that comprises heating a mixture of trigonelline and a pyridine hydrohalide at a temperature of the order of 200° C. for about two hours to produce nicotinic acid, and separating the nicotinic acid.

JOHN WEIJLARD.
JOHN P. MESSERLY.
MAX TISHLER.